June 1, 1965  C. A. McLENNAN ETAL  3,186,369
BUOYANT ARTICLE TRANSPORTER
Filed March 25, 1963  3 Sheets-Sheet 1
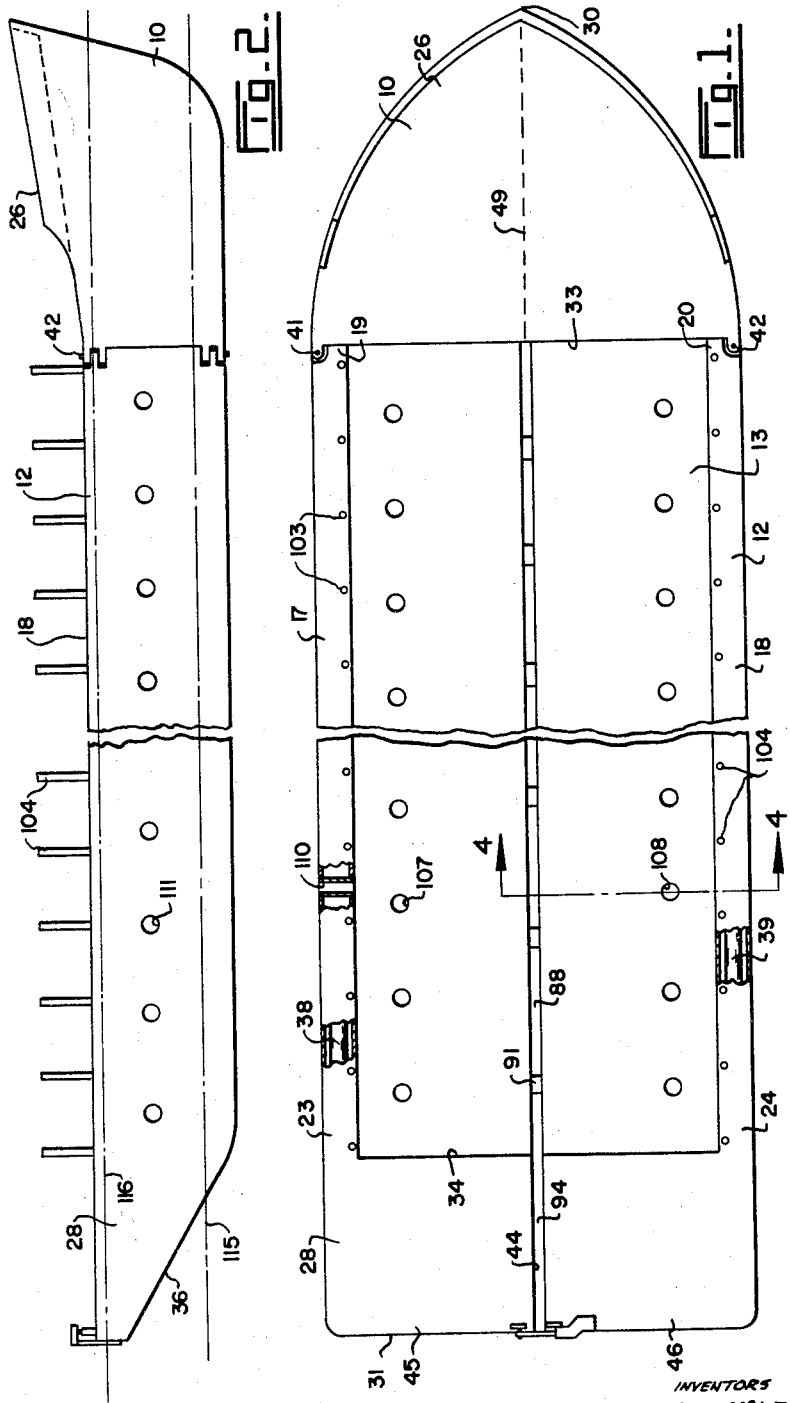
INVENTORS
CHARLES A. McLENNAN
DOUGLAS G. DIXON
BY
Featherstonhaugh & Co.
ATTORNEYS

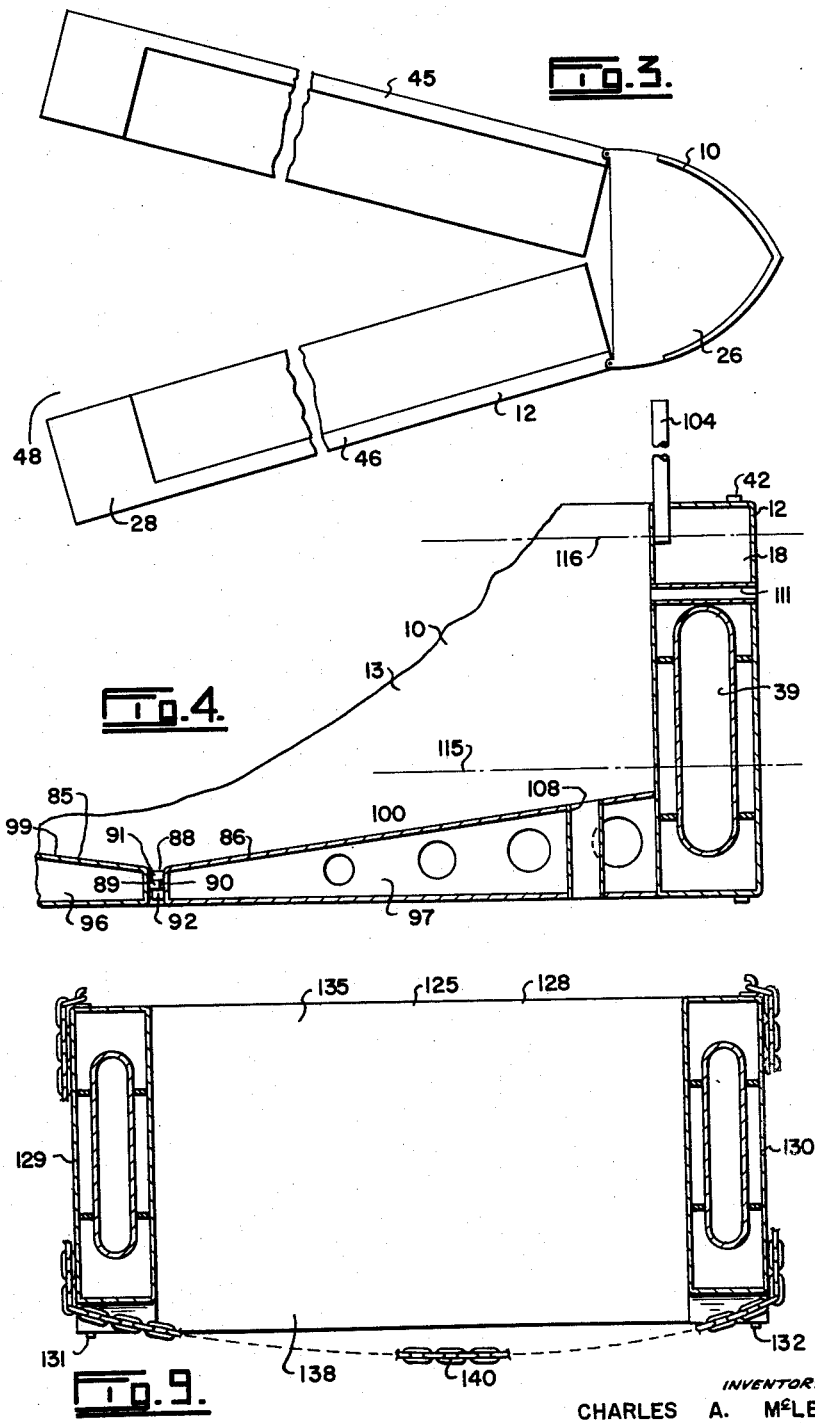

June 1, 1965 C. A. McLENNAN ETAL 3,186,369
BUOYANT ARTICLE TRANSPORTER
Filed March 25, 1963 3 Sheets-Sheet 3
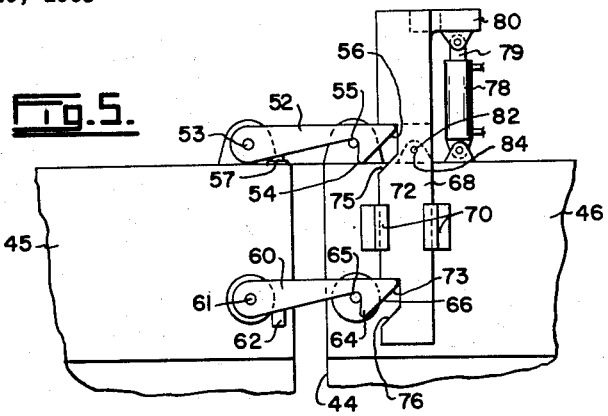
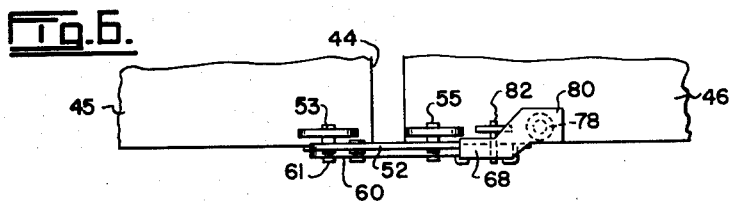
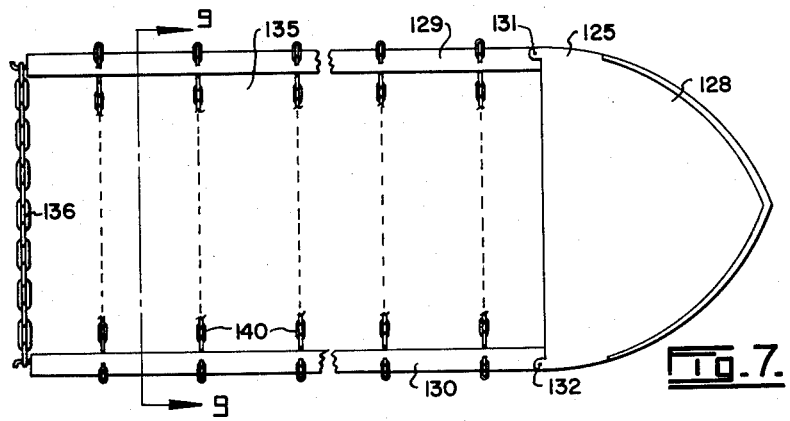
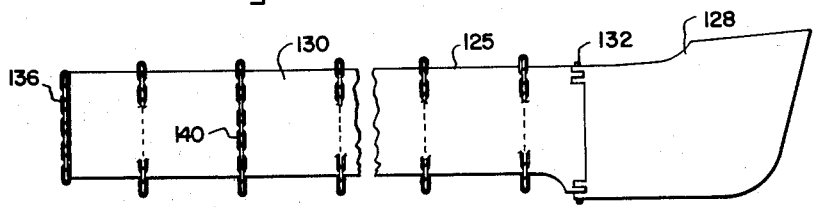
INVENTORS
CHARLES A. McLENNAN
DOUGLAS G. DIXON
BY
ATTORNEYS United States Patent Office 3,186,369
Patented June 1, 1965

3,186,369
BUOYANT ARTICLE TRANSPORTER
Charles A. McLennan, 3308 Valecourt, and Douglas G. Dixon, 1147 W. 22nd St., both of North Vancouver, British Columbia, Canada
Filed Mar. 25, 1963, Ser. No. 267,707
12 Claims. (Cl. 114—43.5)

This invention relates to a transporter for moving buoyant articles over water, and particularly to ocean where the transporter is liable to be subjected to high winds and heavy seas.

This transporter is particularly designed for moving logs in coastal areas, but it may be used for other buoyant articles, such as one or more buoyant containers filled with material or articles to be transported, or containers filled with buoyant material or liquid, such as waterproof bags filled with oil. The invention will be described in connection with logs.

With this transporter, the buoyant articles or logs actually float in the water which supports transporter and within the latter. The transporter may not take any of the load, but it is preferable to make it so that it takes part of the load.

Prior to this invention, logs were moved on water by the following means:

(1) Flat rafts—a raft of this type consists of a plurality of logs or boom sticks chained end to end and surrounding the logs floating in the water. These cannot stand any rough weather without losing a lot of the logs out of the boom, considerable time is required to make them up, and they frequently break apart in storms or rough water.

(2) Davis rafts—the logs are bound by chains and wire into long roughly cylindrical bundles. These require a tremendous amount of wire and chain, and they also require a tremendous amount of time and labour during construction and to break them down. They are very sluggish under tow, and are not satisfactory under heavy weather towing. In fact, they are not usually used in the winter since rough seas are prevalent at that time.

(3) Buoyant barges or scows—the logs are piled up and chained on to the decks of the barges or scows which have to be made strong enough to take the entire load. They have to be loaded and unloaded piecemeal, and are so top-heavy that they can capsize while being towed. The logs have to be placed on the decks, but cannot be dropped thereon, and as they are piled above the deck level, the full load is exposed to the wind, making the barges or scows unmanageable in high winds.

(4) Tipping barges—these are constructed so that when they arrive at their destinations, they may be tipped to allow the logs to toll or slide off the decks thereof. These barges are open to the objections pointed out in (3) above, and they quite frequently do not completely unload when tipped so that the balance of the cargo has to be taken off piecemeal. Furthermore, they cannot handle a partial load since they will not tip unless fully loaded.

The following are some of the advantages of the present buoyant article transporter:

(1) Logs may be dumped directly into the transporter as they land in water or on other logs floating in water within the transporter. No careful piling or positioning is required.

(2) The length or size of the logs does not need to be considered during loading as is the case with scows and barges.

(3) The transporter is designed so that it may be quickly and easily unloaded, and the unloading cannot fail.

(4) A partial load may be carried, if desired.

(5) The transporter takes little, if any, of the load weight.

(6) The centre of gravity of the transporter is low, so that it cannot capsize, either when loaded or unloaded.

(7) At least half of the load is submerged so that less of the load is exposed to wind and sea than with barges carrying the load on the deck.

(8) A much cheaper construction may be used for the transporter than with load-carrying barges because it does not take much weight under full load, and is not subjected to the same twisting and racking action as are the barges.

(9) The transporter can be used to protect and transport floating containers carrying any cargo.

A buoyant article transporter according to the present invention comprises a floating vertical wall forming a confining wall surrounding a chamber for buoyant articles, said confining wall when the transporter is in water extending from below the water surface above the latter to protect articles in the chamber from rough surrounding water, and means at the chamber keeping said chamber in communication with the surrounding water to maintain a water level in the chamber substantially the same as the outside water level, whereby buoyant articles in the chamber float in water therein with the water taking at least part of the load from the transporter.

Examples of this invention are illustrated in the accompanying drawings, in which:

FIGURE 1 is a plan view of a preferred form of buoyant article transporter;

FIGURE 2 is a side elevation of the transporter of FIGURE 1;

FIGURE 3 is a reduced plan showing the transporter in the open or unloading position;

FIGURE 4 is an enlarged cross section taken on the line 4—4 of FIGURE 1;

FIGURE 5 is an enlarged fragmentary and elevation of the transporter, illustrating one form of connecting device used thereon;

FIGURE 6 is a plan view of the apparatus shown in FIGURE 5;

FIGURE 7 is a plan view of an alternative form of transporter;

FIGURE 8 is a side elevation of the transporter of FIGURE 7; and

FIGURE 9 is an enlarged cross section taken on the line 9—9 of FIGURE 7.

Referring to FIGURES 1 to 6 of the drawings, 10 is a buoyant article transporter made up mainly of a floating vertical confining wall 12 surrounding a chamber 13 for buoyant articles, such as logs. The chamber may be of any desired shape, but it is preferably long and comparatively narrow, as shown. This confining wall when the transporter is in the water, extends from below the surface thereof above said surface to protect articles in the chamber from rough surrounding water. Means is provided at the chamber for keeping said chamber in communication with the surrounding water to maintain a level in the chamber substantially the same as the outside water level. This may be accomplished by leaving the bottom of the chamber open, or by forming it with a bottom having one or more relatively large openings therein, and/or by providing one or more openings in the confining wall below the water level. Furthermore, the confining wall 12 may be one continuous wall of comparatively rigid construction, but it is preferable to make this wall in such a way that it may be opened up to permit logs to be floated out of or into chamber 13.

The confining wall 12 of this form of the invention is made up of a pair of spaced floating vertical side walls 17 and 18 having corresponding ends 19 and 20 adjacent each other, and corresponding ends 23 and 24 adjacent each other. A connecting member 26 preferably substantially the same height as walls 17 and 18 extends between and is connected to ends 19 and 20 thereof, said member being of buoyant construction. Similarly, another connecting member 28 extends between and is connected to the ends 23 and 24 of said side wall, said member preferably also being of buoyant construction. These connecting members may be blunt as is member 28, in which case transporter 10 would have blunt ends like a barge or scow, or one or both of said ends may be pointed as is member 26. In this example, connecting member 26 is a bow section having a pointed bow 30, while member 28 is formed with a flat stern 31 which is substantially normal to the planes of side walls 17 and 18. Bow section 26 has an inner wall 33 which extends substantially the height of side walls 17 and 18, while stern section 28 has an inner wall 34 which is also substantially the height of the side walls. The members 26 and 28 are preferably hollow so that they are very buoyant and, if desired, the stern 31 of member 28 may be in the form of a fairly shallow transom, in which case, the section is provided with a bottom 36 which extends from transom 31 down to the lower edges of side walls 17 and 18, as clearly shown in FIGURE 2.

Side walls 17 and 18 may be of any desired construction, provided they are relatively rigid, but it is preferable that they float in water. It has also been found desirable to make walls 17 and 18 very buoyant by providing them with tanks 38 and 39 respectively extending longitudinally thereof. These tanks are normally filled with air, but if desired, pump means, not shown, may be provided for pumping water into and out of these tanks in order to alter the buoyancy of the side walls.

Transporter 10 as described so far will function quite satisfactorily for a number of different purposes. It would be necessary to remove logs from chamber 13 by mechanical means, such as grapples and hoists. However, in the preferred form of the invention, either or both of the walls 17 and 18 is or are hingedly connected to either or both of the connecting members 26 or 28. In the illustrated form, end 19 of wall 17 is connected to member 26 at an end of inner wall 33 thereof by hinges 41. Similarly, one end 20 of wall 18 is connected to member 26 at the opposite end of wall 33 by hinges 42. In order to permit relative outward movement of walls 17 and 18, connecting member 28 is split longitudinally at 44 to divide said member into two sections or halves 45 and 46. In this case, walls 17 and 18 are rigidly connected at their ends 23 and 24 to sections 45 and 46 of the stern section 28. It is obvious that the stern section may be made in piece and hingedly connected to the end of one side wall and releasably connected to the end of the other side wall. The main thing is that walls 17 and 18 may be relatively moved outwardly so that an exit 48 may be provided for chamber 13. It is also obvious that instead of hingedly connecting either or both of walls 17 and 18 to connecting member 26, the latter may be split longitudinally thereof in the same manner as connecting member 28, such a split being indicated by a broken line 49 in FIGURE 1. In this case, member 26 would be formed in two sections which would be hingedly connected together at bow 30.

Any suitable means is provided for releasably connecting sections 45 and 46 of the connecting member 28 to each other. FIGURES 5 and 6 illustrate one form of mechanism which may be used for this purpose. A dog 52 is pivotally mounted at 53 on the upper surface of section 45 of member 28. This dog actually is positioned outwardly of stern 31. The dog has a catch 54 adapted to hook on to a pin 55 carried by section 46 of member 28. Catch 54 has a bevelled outer surface 56. A stop 57 is mounted on section 45 normally to keep dog 52 in a substantially horizontal position. If desired, one or more similar dogs may be mounted on stern 31. In this example, a dog 60 is swingably mounted on a pin 61 which projects from stern 31 of section 45. This dog is maintained in a substantially horizontal position by stop 62. The dog is formed at its free end with a catch 64 adapted to hook on to a pin 65 projecting from the stern of section 46. This catch has a bevelled outer surface 66 on its end.

Dogs 52 and 60 are in substantially the same vertical plane, and a vertical locking bar 68 is provided near the free end of said dogs. This bar is slidably mounted for vertical movement in guides 70 on the stern of section 46. The bar has notches 72 and 73 in an edge thereof into which the free ends of dogs 52 and 60 normally extend. Notch 72 has a bevelled surface 75 near and extending substantially parallel with the dog surface 56, while notch 73 has a bevelled surface 76 near and extending substantially parallel with dog surface 66. Suitable means is provided for raising and lowering locking bar 68. This may be accomplished by means of a hydraulic cylinder 78 mounted on and projecting upwardly from the upper surface of section 46. A ram 79 projects from the upper end of this cylinder and is connected to a projection 80 formed on the upper end of the locking bar and extending over the cylinder.

Dogs 52 and 60 normally grip pins 55 and 65 releasably to secure sections 45 and 46 of connecting member 28 together. When it is desired to release the sections to open chamber 13, cylinder 78 is operated by standard hydraulic apparatus, not shown, to raise locking bar 68. As this is done, the surfaces 75 and 76 of notches 72 and 73 engage the bevelled surfaces 56 and 66 of catches 54 and 64 to raise the dogs clear of pins 55 and 65. When sections 45 and 46 are swung towards each other, pins 55 and 65 engage the bevelled surfaces 56 and 66 to raise the free end of dogs 52 and 60 until catches 54 and 64 drop behind pins 55 and 65, bar 68 being lowered at this time.

In order to be sure that bar 68 cannot lift when it should not, a locking pin 82 may be provided, said pin extending through a member 83 mounted on the upper surface of section 46 and into a hole 84 in the locking bar. This locking pin has to be withdrawn before bar 68 can be raised to release the dogs. If desired, other fastenings or lashings may be applied when the transporter is ready to be moved through the water.

As previously stated, the bottom of chamber 13 may be opened, but it is preferable to provide suitable confining means for preventing logs from getting out of the chamber beneath the confining wall 12. In this example, bottom sections 85 and 86 are connected to side walls 17 and 18, respectively, near the lower edges thereof and extend inwardly therefrom to form a bottom for chamber 13. As it is desirable to form one or more openings in the chamber bottom, bottom sections 85 and 86 are of such length transversely of the transporter that they do not quite meet at the longitudinal centre of the latter so that a large opening 88 is formed in the bottom and extends longitudinally of chamber 13. At spaced points along openings 88, section 85 is formed with a lug 89 projecting away from the inner edge of the section and into a notch 90 formed by upper and lower lugs 91 and 92 projecting away from the inner edge of section 86. The outer ends of lugs 89, 91 and 92 bear against the inner edges of the opposite bottom sections so that they act as spacers to prevent said sections from coming together and closing opening 88. If desired, opening 88 may be carried on at 94 between stern sections 45 and 46.

Bottom sections 85 and 86 are of any desired construction, but they are preferably buoyant and, for this purpose, they may be made with buoyancy chambers 96 and 97. It is desirable to make the upper surfaces 99 and 100 of bottom sections 85 and 86 slope downwardly from their respective side walls 17 and 18 towards the longitudinal centre of the transporter, as clearly shown in FIGURE 4.

If desired, a plurality of stanchions 103 may be removably or permanently mounted on the upper edge of side wall 17. Similarly, a plurality of spaced stanchions 104 may be removably or permanently mounted on and project upwardly from the upper edge of side wall 18.

As stated above, means is provided in transporter 10 for keeping chamber 13 in communication with the surrounding water to maintain a water level in the chamber substantially the same as the outside water level. This may be done by leaving the bottom of the chamber open, or by providing the longitudinal opening 88 in the chamber bottom. If desired, one or more additional openings may be provided in or through bottom sections 85 and 86, such as, openings 107 and 108. Furthermore, one or more openings may be provided in walls 17 and 18 below the water level, such as openings 110 and 111.

When transporter 10 is empty, it rides fairly high in the water owing to the buoyancy of side walls 17 and 18, and bottom sections 85 and 86. The line 115 in FIGURES 2 and 4 indicates the water level when the transporter is empty. When the transporter is loaded, it sinks in the water so that the level inside and outside the transporter is near the top of walls 17 and 18, as indicated by line 116 in FIGURES 2 and 4. By constructing the transporter so that it rides fairly high in the water when empty, it is easier to tow it at this time than would otherwise be the same. However, should high winds be encountered, water may be pumped into tanks 38 and 39 in the side walls to lower the transporter in the water.

When it is desired to load the transporter, the logs may be placed in chamber 13 by suitable cranes. However, as there is always water in the chamber, the logs may be dropped therein, since the water breaks the force of the drop. No special care has to be taken while the logs are loaded in the chamber other than to see that they extend longitudinally thereof, and the load is built up to and beyond the upper edges of side walls 17 and 18. As the load builds up, the lowermost logs rest on bottom sections 85 and 86 to cause the transporter to sink lower in the water. Once the load has been built up to a desired point, chains may be thrown across the top thereof and anchored to the side walls or to stanchions 103 and 104 in any convenient manner. The transporter confines the logs in chamber 13 but takes little or no weight. It can be designed so that it takes no weight at this time, but it is preferable to have it take some of the weight so that the load and transporter in effect become one unit. The main load is taken by the water in the chamber which is substantially the equivalent of the logs floating in the water in which the transporter is floating. If heavy seas pour water into the chamber over the confining wall thereof, the excess water quickly drains out of the chamber so as to keep the water level therein substantially the same as that of the surrounding water. With the construction shown in FIGURES 1 and 2, the transporter would usually be towed from the bow section 26 end thereof. However, it can be towed from the stern section 28. Furthermore, it is obvious that the transporter may be provided with its own power unit so that it is self-propelled or so that it can assist during a towing operation.

If the connecting members 26 and 28 are provided with buoyancy chambers, this helps to reduce pitching in the transporter, and the buoyant side walls 17 and 18 reduce rolling thereof. An advantage of this transporter lies in the fact that the load is at least partially floating in the water in chamber 13 which is in communication with the outside water. If the transporter rolls or pitches, the water gets deeper in the chamber towards the low part of the transporter, and shallower towards the high part. This means that the water at the low part takes more of the load, whereas at the high part, it takes less of the load, in which case, the high part of the transporter takes more of the load. Thus, the buoyant articles or logs tend to resist the rolling and pitching of the transporter.

When it is desired to unload the transporter, any chains across the load have to be released, and then it is only necessary to operate cylinder 78 to lift locking bar 68 and thereby release locking dogs 52 and 60 from pins 55 and 65. This permits stern sections 45 and 46, and, consequently, walls 17 and 18 to swing away from each other to deposit the entire log load in the water. The logs may then be floated out through exit 48. By sloping the upper surfaces 99 and 100 of bottom sections 85 and 86 inwardly, the weight of the load assists in opening up the transporter. The transporter is made ready for further use merely by moving the stern sections 45 and 46 back together and allowing dogs 52 and 60 to engage pins 55 and 65.

FIGURES 7 to 9 illustrate an alternative form of transporter 125. This transporter includes a connecting member 128 with vertical side walls 129 and 130 hingedly connected thereto at 131 and 132, respectively. Member 128 and the side walls form a confining wall for a chamber 135. The end of the chamber opposite member 128 is closed by a suitable connecting member 136 which may be in the form of heavy metal netting or a plurality of chains extending across the end of the chamber and connected to the adjacent ends of the side walls. The bottom of the chamber is open at 138, and it is preferable to provide suitable confining means over said chamber opening. In this example, the confining means is in the form of a plurality of lines 140, usually chains, that extend between the lower edges of walls 129 and 130. It is preferable to bring these lines or chains up the outer surfaces of the side walls, as shown, and to connect them to said walls at the upper edges thereof. At least one end of each line is removably connected to the adjacent side wall.

Transporter 125 functions in the same manner as transporter 10. The logs are piled up in chamber 135 and, if desired, above the upper edges of side walls 129 and 130. The upper part of the load is held in place by chains thrown over the top thereof and secured to the side walls. The interior of chamber 135 is in communication with the water in which the transporter is floating through the open bottom 138. When it is desired to unload the transporter, one end of each line or chain 140 is released from the side wall to which it is connected, and one end of connecting member 136 is released from the end of the side wall to which it is connected. This allows the side walls 129 and 130 to float away from each other to permit the logs to float out of the chamber.

What we claim as our invention is:

1. A buoyant article transporter comprising a floating vertical wall forming a confining wall surrounding a chamber for buoyant articles, said confining wall being divided into two side sections relatively movable in a horizontal direction, said wall when the transporter is in water extending from below the water surface above the latter to protect articles in the chamber from rough surrounding water, confining means connected to the confining wall and extending beneath the chamber to prevent floating articles from getting out of the chamber under said wall, and means throughout the lower portion of the chamber keeping said chamber constantly in communication with the surrounding water to maintain a water level in the chamber substantially the same as the outside water level, whereby buoyant articles in the chamber float in water therein with the water taking at least part of the load from the transporter and a side section of the wall can be moved away from the other side section thereof to permit the articles to float out of the chamber.

2. A buoyant article transporter comprising a pair of spaced floating vertical side walls, corresponding ends of the two walls being adjacent each other, a connecting member substantially the same height as the side walls extending between and connected to each pair of adjacent ends of said walls, said walls and connecting members forming a confining wall surrounding a chamber for buoyant articles, at least one of said connecting members being such as selectively to permit relative movement of the side walls in a horizontal direction, said confining wall when the transporter is in water extending from below the water surface above the latter to protect articles in the chamber from rough surrounding water, shiftable confining means connected to the confining wall and extending beneath the chamber to prevent floating articles from getting out of the chamber under said wall, and means throughout the lower portion of the chamber keeping said chamber constantly in communication with the surrounding water to maintain a water level in the chamber substantially the same as the outside water level, whereby buoyant articles in the chamber float in water therein with the water taking at least part of the load from the transporter and a side wall can be moved away from the other side wall to permit the articles to float out of the chamber.

3. A buoyant article transporter comprising a pair of spaced floating vertical side walls, corresponding ends of the two walls being adjacent each other, means extending between and hingedly connecting one pair of adjacent ends of said walls, said connecting means forming a wall substantially the same height of the side walls, means extending between and releasably connecting the other pair of adjacent ends of the side walls, said releasable connecting means forming a wall substantially the same height as the side walls, all of said walls forming a confining wall surrounding a chamber for buoyant articles, said confining wall when the transporter is in water extending from below the water surface above the latter to protect articles in the chamber from rough surrounding water, shiftable confining means connected to the confining wall and extending beneath the chamber to prevent floating articles from getting out of the chamber under said wall, and means at the chamber constantly keeping said chamber in communication with the surrounding water to maintain a water level in the chamber substantially the same as the outside water level, whereby buoyant articles in the chamber float in water therein with the water taking at least part of the load from the transporter, and said side walls being swingable away from each other due to the hinge connecting means when the releasable connecting means is released to permit the buoyant articles to float out of the chamber.

4. A buoyant article transporter comprising a pair of spaced floating vertical side walls, corresponding ends of the two walls being adjacent each other, means extending between and hingedly connecting one pair of adjacent ends of said walls, said connecting means forming a wall substantially the same height of the side walls, means extending between and releasably connecting the other pair of adjacent ends of the side walls, said releasable connecting means forming a wall substantially the same height as the side walls, all of said walls forming a confining wall surrounding a chamber for buoyant articles, said confining wall when the transporter is in water extending from below the water surface above the latter to protect articles in the chamber from rough surrounding water, a bottom section connected to each side wall near the lower edge thereof and extending inwardly therefrom, the bottom sections of the two side walls combining to form a bottom for the chamber, and opening means throughout the length of said bottom large enough to maintain a water level in the chamber substantially the same as the outside water level, whereby buoyant articles in the chamber float in water therein with the water taking at least part of the load from the transporter, and said side walls and the bottom sections connected thereto being swingable away from each other due to the hinge connecting means when the releasable connecting means is released to permit the buoyant articles to float out of the chamber.

5. A buoyant article transporter comprising a floating vertical wall forming a confining wall surrounding a chamber for buoyant articles, said confining wall being divided into two side sections relatively movable in a horizontal direction, said wall when the transporter is in water extending from below the water surface above the latter to protect articles in the chamber from rough surrounding water, a bottom section connected to each side section near the lower edge thereof and extending inwardly therefrom, the bottom sections of the two side sections combining to form a bottom for the chamber, and opening means throughout the length of said bottom large enough to maintain a water level in the chamber substantially the same as the outside water level, whereby buoyant articles in the chamber float in water therein with the water taking at least part of the load from the transporter and a side section of the wall can be moved away from the other side section thereof to permit the articles to float out of the chamber.

6. A transporter as claimed in claim 5 in which the bottom sections are of buoyant construction.

7. A transporter as claimed in claim 5 in which the opening in the transporter is formed by the termination of the inwardly-extending bottom sections just short of each other.

8. A transporter as claimed in claim 5 including a plurality of openings in at least one side wall to permit water to flow into and out of the chamber therethrough.

9. A buoyant article transporter comprising a floating vertical wall forming a confining wall surrounding a chamber for buoyant articles, said confining wall being divided into two side sections relatively movable in a horizontal direction, said wall when the transporter is in water extending from below the water surface above the latter to protect articles in the chamber from rough surrounding water, and a plurality of spaced lines releasably connected at the ends thereof to the lower edge of the confining wall and extending across the chamber to form confining means extending beneath the chamber to prevent floating articles from getting out of the chamber under said wall, the spaces between the lines forming openings to maintain a water level in the chamber substantially the same as the outside water level, whereby buoyant articles in the chamber float in water therein with the water taking at least part of the load from the transporter and a side section of the wall can be moved away from the other side section thereof to permit the articles to float out of the chamber.

10. A buoyant article transporter comprising a pair of spaced floating vertical side walls, corresponding ends of the two walls being adjacent each other, means extending between and hingedly connecting one pair of adjacent ends of said walls, said connecting means forming a wall substantially the same height of the side walls, means extending between and releasably connecting the other pair of adjacent ends of the side walls, said releasable connecting means forming a wall substantially the same height as the side walls, all of said walls forming a confining wall surrounding a chamber for buoyant articles, said confining wall when the transporter is in water extending from below the water surface above the latter to protect articles in the chamber from rough surrounding water, a plurality of spaced lines connected at the ends thereof to the two side walls and extending between the lower edges thereof to form confining means extending beneath the chamber to prevent floating articles from getting out of the chamber under said confining wall, one end of each line being releasably connected to its side wall, the spaces between the lines forming openings to maintain a water level in the chamber substantially the same as the outside water level, whereby buoyant articles in the chamber float in water therein with the water taking at least part of the load from the transporter, and said side walls being swingable away from each other due to the hinge connecting means when the releasable connecting means is released to permit the buoyant articles to float out of the chamber.

11. A transporter as claimed in claim 1 in which the confining wall is formed with buoyancy means therein.

12. A transporter as claimed in claim 5 in which the confining wall and the bottom sections are formed with buoyancy means therein.

References Cited by the Examiner

UNITED STATES PATENTS

| 180,622 | 8/76 | Murphy | 114—30 |
| 1,803,104 | 4/31 | Fletcher | 114—43.5 X |

FOREIGN PATENTS

| 618,320 | 2/49 | Great Britain. |

FERGUS S. MIDDLETON, *Primary Examiner.*